May 2, 1967  J. A. BROWNING  3,317,704
ELECTRIC ARC TORCHES
Filed Aug. 29, 1966

JAMES A. BROWNING
INVENTOR

United States Patent Office 3,317,704
Patented May 2, 1967

3,317,704
ELECTRIC ARC TORCHES
James A. Browning, Hanover, N.H., assignor to Thermal Dynamics Corporation, Lebanon, N.H., a corporation of New Hampshire
Filed Aug. 29, 1966, Ser. No. 575,803
4 Claims. (Cl. 219—137)

My invention relates to welding devices and processes, and relates more particularly to improved means for applying plasma-arc electric arc torches to the art of welding.

Electric arc torches generating a gas stabilized arc column and an effluent including hot gases at least partially in the plasma state have found increasing application to a variety of industrial processes. One important application is in fusion welding, where the arc column is directed at the interface of two segments to be joined. The principal functions of the plasma forming gas are (a) to gas-stabilize the arc column centrally in the torch nozzle passageway and (b) to produce in the external portion of the arc column sufficient stiffness to permit its being directed precisely to the weld zone. While in many uses of electric arc torches the plasma effluent is an important heat transfer agent, in welding the arc column and the resulting anode heating effect on the material to be joined is the primary operative mechanism. The action of the gas, although producing the desired arc characteristics for the welding process, also produces an undesirable application of heat to the zones adjacent to the weld line.

To eliminate the undesirable heating effects of the plasma stream on the work is the principal purpose of my invention.

For a more complete understanding of the invention, I now refer in detail to the accompanying drawing in which.

Figure 1:
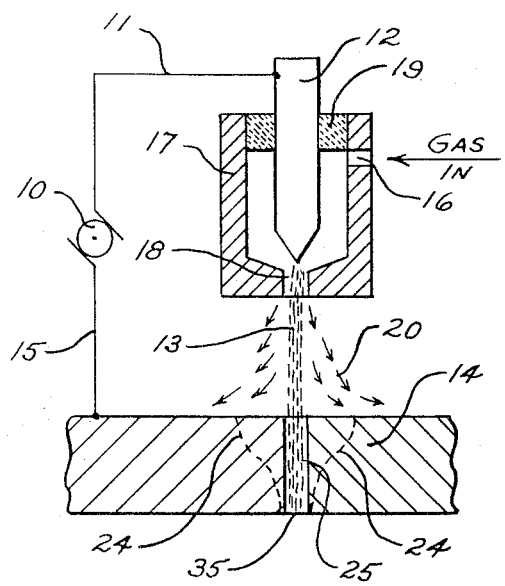
FIGURE 1 is a view in cross-section of a simplified plasma forming electric arc torch operating in a conventional manner to produce a weld bead.

Referring now more particularly to FIGURE 1, I show a torch body 17 defining a plenum chamber opening with a nozzle passageway 18. An electrode 12 is mounted within the body 17 and is electrically separated therefrom by a ceramic closure 19. A suitable power supply 10 is connected by leads 11 and 15 to electrode 12 and a workpiece 14 respectively. The power supply 10 is capable of establishing and maintaining an arc column 13 between electrode 12 and the workpiece 14. An arc stabilizing gas is introduced under pressure at inlet 16, emerges around the arc column from the passageway 18, and then fans out as shown by the arrows in FIGURE 1. It should be understood that the workpiece 14 is in two sections mechanically abutted together to be joined by fusion along the interface.

To accomplish this the arc column 13 impinges on the work at the interface 35. The momentum of the gas contained within and around the arc column forces the arc to penetrate entirely through the workpiece producing what is called a "keyhole" and a fusion zone in the "wineglass" shape as shown by the dotted lines 24. Molten metal forms the weld bead and the pieces are effectively joined without the addition of metal. It is desirable to keep the weld zone as narrow as possible; and this is effectively accomplished at the portion of the joint remote from the torch, thus creating the wine-glass shape. Near the top surface, however, the weld zone broadens due to the spreading out of the hot plasma stream which flows over the surface and produces a fused zone as defined by dotted lines 24. The enlargement of the top of the weld zone is entirely unnecessary for effective joining of the work, and furthermore produces undesirable metallurgical effects over an unnecessarily extended region on the work.

Figure 2:
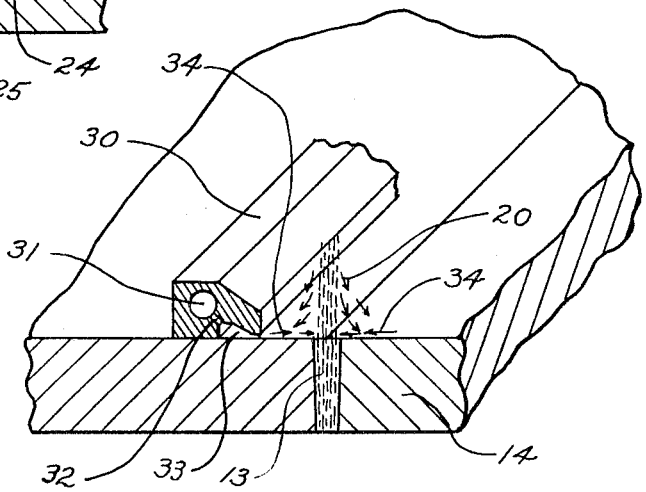
FIGURE 2 is a view, partly in section and partly in perspective, of the weld zone and a unit constructed and applied in accordance with the invention.

To overcome this I place along the weld line on each side thereof, a gas manifold 30, only one of which is shown in FIGURE 2 for clarity of illustration. The manifold need not extend the entire length of the weld, but it may be attached to the torch to move along with it as the weld progresses, or remain in a given position with the work fed along under it as desired. An elongated slot forms a chamber 33 communicating through a passage 32 with a gas inlet hole 31. The chamber 33 is so shaped as to guide a suitable gas, applied under pressure at 31, so as to flow in a ribbon along the top surface of the work toward the weld line. The layer of cool gas is constantly renewed and acts partially as a simple cooling agent. More importantly, the added gas acts as a cold wedge lifting the plasma stream, resulting in its being diverted from the work surface and then de-ionized without the heat of recombination being applied to the work surface adjacent to the weld. The arrows 34 (FIGURE 2) show the additional gas flowing toward the opposite side of the weld line from the manifold not shown.

The "wine-glass" shape characteristic of welds produced with a plasma arc torch alone is greatly reduced in width at the top surface; relatively straight sided welds as shown in FIGURE 2 are achieved with minimum surface damage.

The importance of my invention lies in the fact that it permits the use of gas stabilized arc columns, with their stiffness and attendant advantages of precise control and direction to the exact zone of weld, without suffering the usual concomitant effects of the plasma stream which is necessary for arc control, but which transports heat to broader zones than are desirable or in some cases even permissible.

Figure 3:
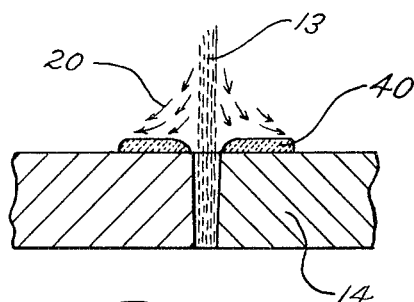
FIGURE 3 is a view, in section, of an alternative method of applying the principles of the invention.

In some welding problems, space limitations prevent the use of the manifolds of FIGURE 2. I find that the protection afforded can be achieved in large part by pre-coating the zone along the line to be welded with a deposit of refractory oxide or a ceramic, as shown in FIGURE 3. The coating 40 need not be particularly thick. I have found a thickness in the order of .005 inch is usually sufficient to keep the plasma gases from seriously affecting the work material. A variety of materials may be used effectively. Those developed recently for nose cones on re-entry vehicles, having high hydrogen content, are very effective. Here, the plasma zones of the arc effluent are diverted while the central arc column 13 is left to pierce the work interface and form the union by fusion.

While I have described particular embodiments of my invention, I intend to comprehend within its scope modifications following the spirit of the appended claims.

I claim:

1. A device for use in welding with a plasma generating electric arc torch comprising a manifold interposed between said torch and two sections of a workpiece to be joined, and lying alongside the weld line; means for introducing a fluid under pressure to said manifold; and an outlet in said manifold at the surface of the workpiece to direct said fluid parallel to and along the surface of the workpiece toward the weld line.

2. A device according to claim 1 in which said manifold is placed on each side of said weld line with the fluid directed from each side toward said line.

3. A device according to claim 1 in which said outlet is in the form of an elongated slot lying at the workpiece surface and along at least a portion of said weld line.

4. In the process of welding using a plasma generating electric arc torch, the method of keeping hot plasma gases from striking the work surfaces adjacent the weld line, which comprises directing a flow of cool gas parallel to and along the said surfaces and toward the weld line from both sides thereof, whereby the said cool gas acts as an underlying wedge to keep the plasma gases from reaching said surfaces.

References Cited by the Examiner
UNITED STATES PATENTS

| | | | |
|---|---|---|---|
| 1,775,532 | 9/1930 | Le Boeuf | 219—72 X |
| 2,250,940 | 7/1941 | Zahn et al. | 279—137 |
| 2,806,124 | 9/1957 | Gage | 219—121 |
| 2,852,660 | 9/1958 | Maloney | 219—74 |
| 3,223,823 | 12/1965 | Keller | 219—127 |

RICHARD M. WOOD, *Primary Examiner.*